Feb. 10, 1942.   L. J. WIENER   2,272,652
BED SPRING
Filed July 28, 1939
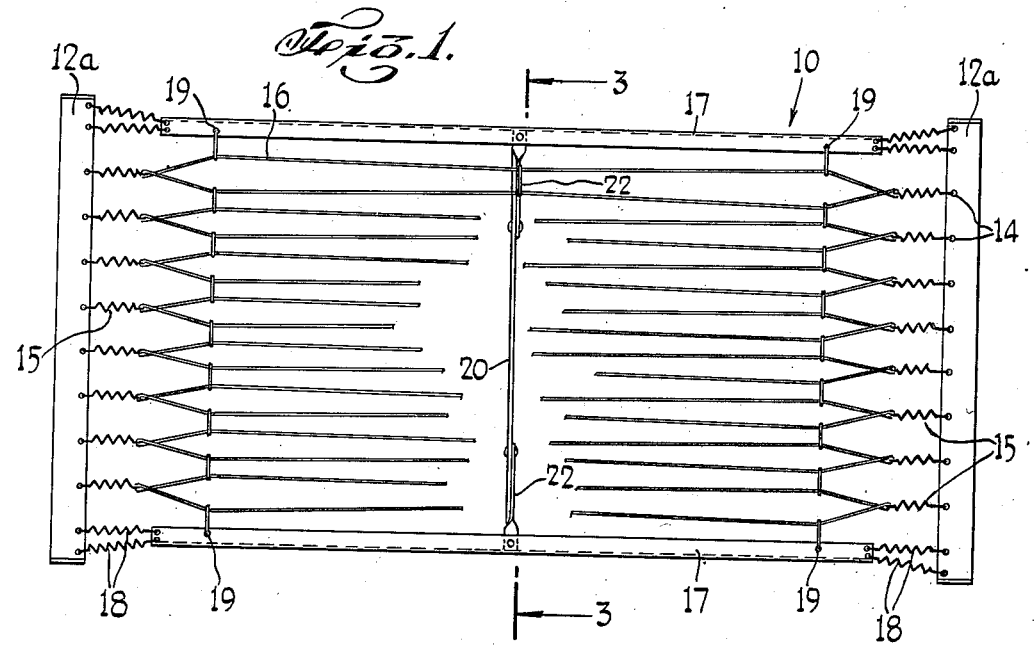
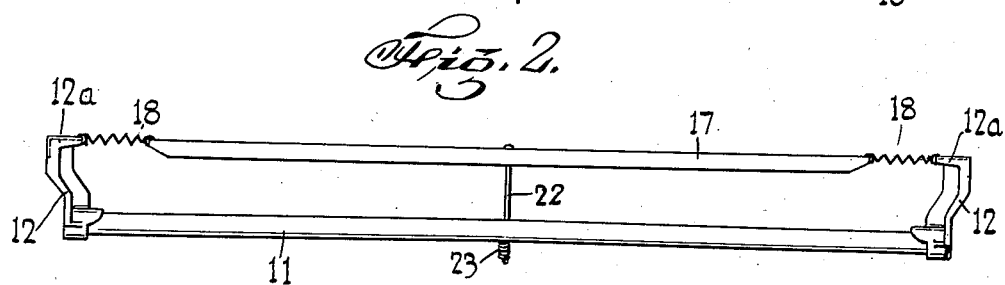
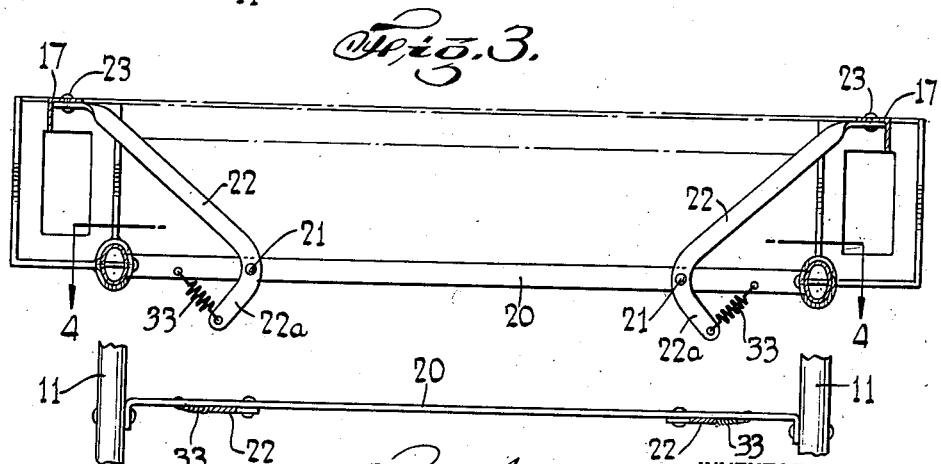
INVENTOR
LOUIS J. WIENER
BY
ATTORNEY Patented Feb. 10, 1942

2,272,652

UNITED STATES PATENT OFFICE 2,272,652

BED SPRING

Louis J. Wiener, Brooklyn, N. Y.

Application July 28, 1939, Serial No. 286,978

5 Claims. (Cl. 5—228)

This invention relates generally to bed springs. More particularly, my invention relates to an improved construction of the type of bed springs known as cable or link springs.

One of the objects of my invention is to provide in a bed spring construction of the character described improved and novel means for preventing undue sagging of the spring, and particularly the longitudinal edges thereof.

Another object of my invention is to provide a bed spring construction of the type employing a cables or links which shall comprise relatively few and simple parts, which shall be relatively inexpensive to manufacture, and which at the same time shall be highly efficient for the purposes intended.

Other objects of this invention will in part be obvious and in part hereinafter pointed out.

The invention accordingly consists in the features of construction, combinations of elements, and arrangements of parts which will be exemplified in the construction hereinafter described, and of which the scope of application will be indicated in the claims.

In the accompanying drawing, in which is shown one of the various possible embodiments of this invention, Fig. 1 is a top plan view of a bed spring constructed in accordance with my invention;

Fig. 2 is a side elevational view thereof;

Fig. 3 is an enlarged cross-sectional view taken substantially on the line 3—3 of Fig. 1; and Fig. 4 is a cross-sectional view taken substantially on the line 4—4 of Fig. 3.

Referring now in detail to the drawing, there is disclosed a bed spring 10 constructed in accordance with my invention and which is of the type generally known in the art as cable or link springs, as distinct from other types of bed spring constructions employing vertically disposed foundation or coil springs. The bed spring of my invention may comprise a pair of rigid longitudinal lower supports 11, preferably of hollow tubular or pipe construction. The supports 11 are interconnected by transverse upwardly extending supporting members 12 provided with flattened angle portions 12a extending inwardly toward each other in opposed relationship, as clearly shown in Figs. 1 and 2. The angle portions 12a are provided with a plurality of spaced apertures 14, into which there is received one end of a plurality of coil springs 15 of usual construction. The ends of the coil springs 15, remote from the supporting members 12, are correspondingly interconnected by resilient cables 16, in the customary manner, as shown in Fig. 1, to provide a resilient upper surface for the bed spring. If desired, instead of the cables 16, pivotally interconnected links may be employed in the manner well known to the art. At the longitudinal edges of the upper surface of the spring, there is provided a pair of rigid non-bendable rails 17, which are of metallic material and which may be inverted L-shaped, with the horizontal leg being substantially flush with the surfaces 12a of the members 12. The rails 17 are interconnected with the members 12 by pairs of coil springs 18, similar to the springs 15. The horizontal legs of the members 17 are provided with apertures 19 for interconnecting the cable system 16 with the rigid rails 17 in a transverse direction.

It has been found in bed springs of the type herein described that in the constructions heretofore employed there was a tendency, when a weight was applied to the spring, for the rails 17 to sag to such an extent that they would at times rest upon the pipe supports 11, such times for example as when a person sits on the edge of the bed. I have, therefore, provided, in accordance with my invention, a device designed to overcome the above described disadvantage, by preventing the undue sagging of the spring and at the same time retaining the necessary resilience for the spring. Such device comprises a rigid rod member 20 transversely disposed with respect to the spring 10 and rigidly connected at opposite ends thereof to the pipe supports 11. The member 20 is preferably disposed midway between the members 12 and parallel thereto. Pivotally mounted on the member 20, adjacent opposite ends thereof, by means of the pivots 21, are a pair of angularly disposed link members 22. These links 22 are preferably permanently attached at their upper ends to the rails 17. Rivets 23 or any other suitable fastening means may be employed for permanently attaching the links 22 to the rail 17.

It is thus seen from the above described construction that when a weight is applied to the upper surface of the spring, such as when a person sits on the edge of the bed, the links 22 will tend to rotate about the pivots 21 in opposite directions. In order to provide a resilient retardation of the movement of the links 22 and of the consequent downward movement of the cables 16 and rails 17 of the spring, the link 22 is provided with an arm portion 22a disposed at an angle to the main portion thereof. The arm portions 22a are interconnected with the member 20 by means of springs 33, as clearly shown in Fig. 3 of the drawing.

It is thus seen that the tendency for the rails 17 to rest upon the supports 11 will be resiliently resisted by the links 22 and the springs 33.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a bed spring employing cables or links to form a flat horizontal supporting surface, a pair of spaced longitudinal lower rigid supports running lengthwise of said bed spring, a pair of transverse members interconnecting opposite ends of said supports to form a substantially rectangular shaped lower supporting frame, said transverse members having integral flat leg portions at the ends of said bed spring which are disposed substantially in the plane of said flat surface, a pair of rigid longitudinal rails parallel to said lower longitudinal supports, said rails being of inverted L-shaped cross-sectional contour, one leg of said rail being horizontally disposed in substantially the plane of said flat surface and the other leg of said rail being vertically disposed to define a side edge of said bed spring, a plurality of longitudinally arranged parallel helical springs disposed substantially in the plane of said flat surface and interconnecting said flat surface and said rigid rails with the flat leg portions of said transverse members, helical springs interconnecting the ends of said rigid rails with said flat leg portions of said transverse members, said last named springs sloping away from the center of said bed, members interconnecting said flat supporting surface with said rigid rails, and means for preventing undue sagging of said cables or links and said rails, said means comprising a rigid member perpendicularly disposed with respect to said lower longitudinal supports and rigidly attached therebetween, a pair of links, each link being pivotally mounted on said last named rigid member adjacent opposite ends thereof, said pivot points being spaced inwardly of said rigid rails, the upper end of each of said links being rigidly attached to one of said rigid rails, the other ends of said links projecting downwardly and outwardly of said pivot points, and a spring interconnecting the other end of each of said links with said perpendicular member at a point spaced outwardly from said pivot points.

2. In a bed spring employing cables or links, a pair of spaced longitudinal lower rigid supports, transverse members interconnecting opposite ends of said supports to form a substantially rectangular shaped lower frame, said transverse members having portions projecting upwardly above the plane of said supports, a pair of rigid longitudinal rails parallel to said lower supports and resiliently connected at opposite ends thereof to said upwardly projecting transverse member portions to form an upper substantially rectangular frame adapted to support said cables or links therebetween, each of said rails including a horizontal leg disposed substantially in the plane of said cables or links, means for preventing undue sagging of said cables or links and said rails, said means comprising a pair of links, each link being rigidly attached at one end thereof to one of said upper rails and pivotally attached intermediate its ends to a transverse supporting member attached to said lower supports, the other end of each of said links being connected by a spring to said transverse supporting member, said sag preventing means being so constructed and arranged as to resiliently urge said rails towards each other and away from said lower rigid support, and means for resiliently urging said rigid rails apart.

3. In a bed spring employing cables or links, a pair of spaced longitudinal lower rigid supports arranged lengthwise of said bed spring, transverse members interconnecting opposite ends of said supports to form a substantially rectangular shaped lower frame, said transverse members having portions projecting upwardly above the plane of said supports, a pair of rigid longitudinal rails parallel to said supports and resiliently connected at opposite ends thereof to said upwardly projecting transverse member portions to form an upper substantially rectangular frame adapted to support said cables or links therebetween, each of said rails including a horizontal leg disposed substantially in the plane of said cables or links, means for preventing undue sagging of said cables or links and said rails, said means comprising a rigid member transversely disposed with respect to one of said lower longitudinal supports and rigidly attached thereto, a pair of links pivotally mounted on said last named transverse rigid member, one end of each of said links on one side of said pivot being rigidly fixed to an upper rail, and a spring interconnecting the opposite end of each of said links at a point on the other side of said pivot to a support rigid with said pivot, said springs and links being so constructed and arranged as to resiliently urge said rigid rails upwardly and towards the center of said bed spring, and means including springs to resiliently urge said rigid rails away from the center of said bed spring.

4. In a bed spring employing cables or links, a pair of spaced longitudinal lower rigid supports arranged lengthwise of said bed spring, transverse members interconnecting opposite ends of said supports to form a substantially rectangular shaped lower frame, said transverse members having portions projecting upwardly above the plane of said lower longitudinal supports, a pair of rigid longitudinal rails parallel to said lower longitudinal supports and resiliently connected at opposite ends thereof to said upwardly projecting transverse member portions to form an upper substantially rectangular frame adapted to support said cables or links therebetween, each of said rails including a horizontal leg disposed substantially in the plane of said cables or links, means for preventing undue sagging of said cables or links and said rails, said means comprising a rigid member transversely disposed with respect to one of said lower longitudinal supports and rigidly attached thereto, a pair of links pivotally mounted intermediate their ends on said last named rigid member, each of said links comprising a main portion and a portion angularly disposed with respect to said main portion, one end of the main portion of each of said links being rigidly fixed to one of said upper rails, and a spring interconnecting each of the angularly disposed link portions to said transverse rigid member, said springs and links being so constructed and arranged as to resiliently urge said rigid rails upwardly and towards the center of said bed spring, and means including springs to resiliently urge said rigid rails away from the center of said bed spring.

5. In a bed spring employing cables or links, a pair of spaced longitudinal lower rigid supports arranged lengthwise of said bed spring, transverse members interconnecting opposite ends of said supports to form a substantially rectangular shaped frame, said transverse members having portions projecting upwardly above the plane of said supports, a pair of rigid longitudinal rails parallel to said lower longitudinal supports, said rails being of inverted L-shaped cross-sectional contour and resiliently connected at opposite ends thereof to said upwardly projecting transverse member portions to form an upper substantially rectangular frame adapted to support said cables or links therebetween, the horizontal leg of each of said rails being disposed substantially in the plane of said cables or links, means for preventing undue sagging of said cables or links and said rails, said means comprising a rigid member transversely disposed with respect to said lower longitudinal supports and rigidly attached therebetween, a pair of links, each link being pivotally mounted on said last named rigid transverse member adjacent opposite ends thereof, one end of each link being rigidly attached to a leg of one of said upper rails and a spring interconnecting the other end of each of said links with said transversely disposed rigid member attached to said lower longitudinal supports to normally urge said rails and corresponding lower longitudinal supports apart and said rails together, and means including springs interconnecting said rails and the upper portions of said transverse members for resiliently urging said rails apart.

LOUIS J. WIENER.